United States Patent [19]

Suga

[11] 4,150,898

[45] Apr. 24, 1979

[54] COLORIMETER EMPLOYING PRIMARY FILTER MIRRORS

[76] Inventor: Shigeru Suga, Yoyogi 5-20-2, Shibuya, Tokyo, Japan

[21] Appl. No.: 829,460

[22] Filed: Aug. 31, 1977

[30] Foreign Application Priority Data

Feb. 2, 1977 [JP] Japan .............................. 52-011841

[51] Int. Cl.² ............................................. G01J 3/46
[52] U.S. Cl. ................................. 561/405; 250/226; 250/228; 356/407; 356/236
[58] Field of Search ................. 356/176, 236, 73, 177, 356/178, 184, 236, 190; 250/228, 573–5.75, 226, 228; 350/315, 317

[56] References Cited

U.S. PATENT DOCUMENTS

| 3,838,926 | 10/1974 | Kato et al. | 250/228 |
| 3,874,799 | 4/1975 | Isaacs et al. | 250/228 |
| 3,998,855 | 12/1976 | Suga | 250/228 |
| 4,025,199 | 5/1977 | Okame | 356/190 |

OTHER PUBLICATIONS

Trial Manufacture of Photoelectric Colorimeter using Optical Fibers; Ishikawa et al; Bull. Tokyo Deut. Coll. vol. 10, No. 4, pp. 191-197, Nov. 1969.

Science New Industrial Materials B-12 Organic Pigment, Kanehara Publishing Co. Ltd., Oct. 20, 1968 T. Kuwata.

*Primary Examiner*—John K. Corbin
*Assistant Examiner*—B. W. de los Reyes
*Attorney, Agent, or Firm*—Wenderoth, Lind & Ponack

[57] ABSTRACT

In a colorimeter including a light source, a first quantity of light is directed toward a color sample and from the color sample toward a single photoelectric receiving and measuring device which is capable of measuring amounts of primaries or tristimulus values in quantities of light. A first carriage has mounted thereon an X primary filter, a Y primary filter and a Z primary filter, and such first carriage is reciprocable so that a selected primary filter may be positioned in front of the single photoelectric device. Adjacent the light source is mounted a second carriage which supports thereon an X primary filter mirror, a Y primary filter mirror and a Z primary filter mirror. The second carriage is reciprocable to position adjacent the light source a selected primary filter mirror corresponding to that primary filter positioned adjacent the photoelectric device. A second quantity of light from the light source is directed toward the selected primary filter mirror which reflects and changes the spectral characteristics of the second quantity of light. This second quantity of light is then directed toward the color sample and through the selected primary filter to the photoelectric device. Thus, the photoelectric device simultaneously receives two quantities of light and measures a resultant amount of the selected primary or tristimulus value therefrom.

13 Claims, 14 Drawing Figures

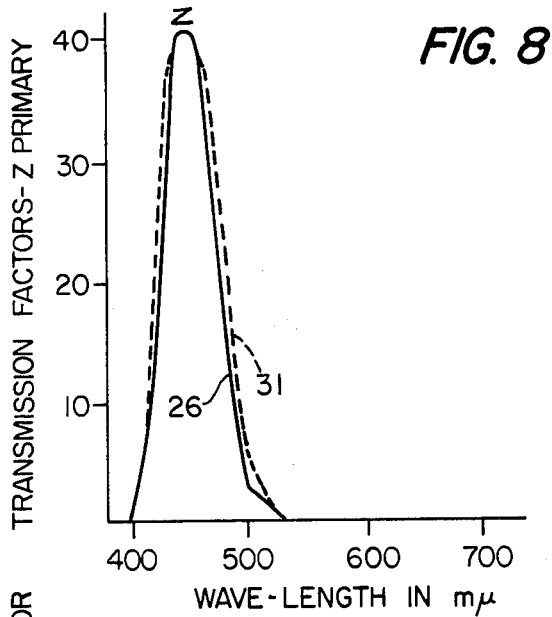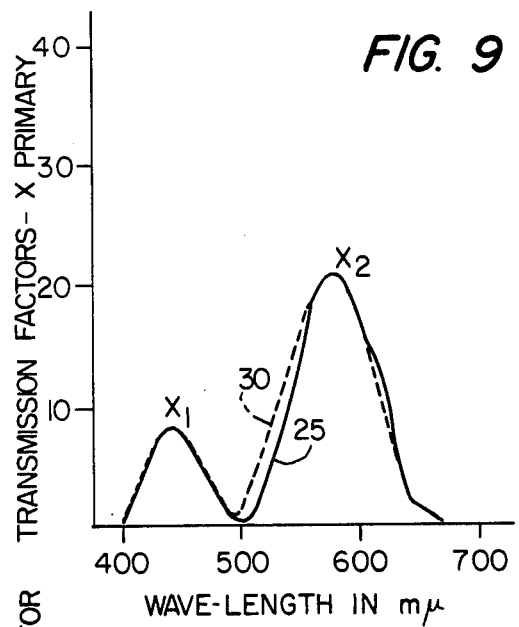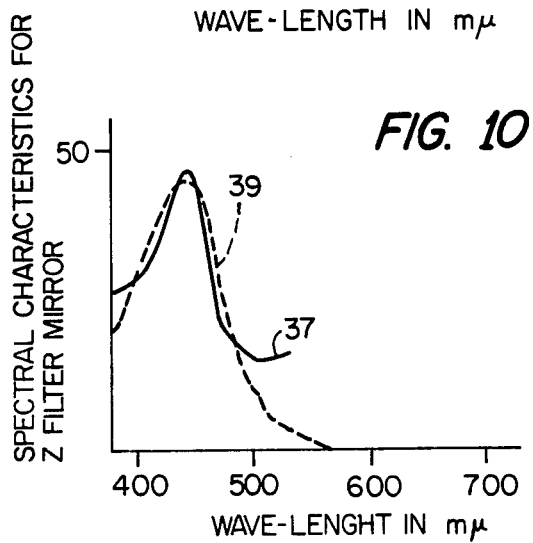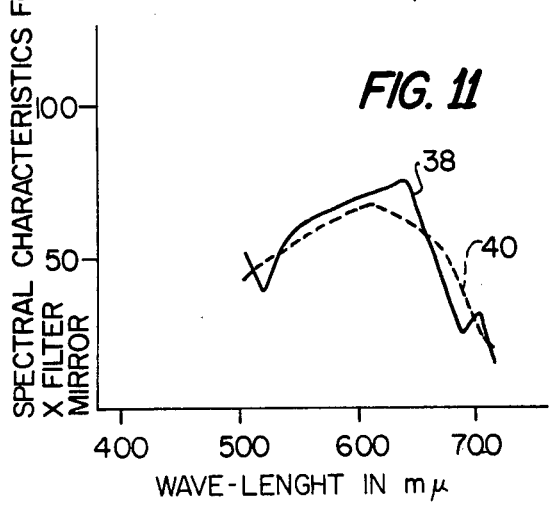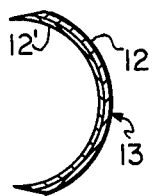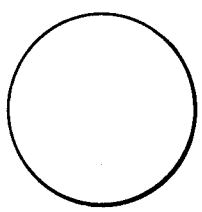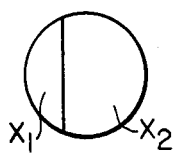

COLORIMETER EMPLOYING PRIMARY FILTER MIRRORS

BACKGROUND OF THE INVENTION

The present invention relates to an improved photoelectric colorimeter of the type capable of determining the amounts of X, Y and Z primaries or thristimulus values in a color sample.

It is to be understood that the term "primary" as employed herein is intended to convey that meaning conventionally used in the colorimetry art. That is, the "primaries" are not used as real colors, but are merely three functions of wave length that have certain features found to be convenient for the designation of color.

Photoelectric colorimeters are known wherein light from a light source is directed through an optic system against a color sample, the light being reflected by the color sample toward three photoelectric detecting devices. In front of each photoelectric detecting device is positioned a primary filter to conform the spectral sensitivity of the respective photoelectric detecting devices as close as possible to the respective primaries or tristimulus values. A measuring device is connected to the three photoelectric detecting devices and reads or measures the amounts of the respective primaries or tristimulus values in the light reflected from the color sample.

It has however been found that although it is theoretically possible to design primary filters which correspond exactly to the ideal, it is in fact not possible to manufacture primary filters which have transmission factors corresponding to the ideal. That is, the measurements of the amounts of primaries or tristimulus values in a given color sample have an inherent error therein due to differences between actual and theoretical transmission factors of the primary filters.

Past attempts to correct this error have involved attempts to alter the transmission factor characteristics of the primary filters by forming the primary filters by a plurality of superimposed colored plates. However, since the spectral characteristics of the colored plates depend upon the components of the materials employed therein, normally glass, it is generally impossible to exactly match the theoretical transmission factors. It has been found to be virtually impossible to accurately duplicate the theoretical transmission values over the complete wave length range of the primaries or tristimulus values. Further, by increasing the number of plates, the amount of light received or passed through the primary filter is undesirably decreased. Further, it will be apparent that attempts to fabricate primary filters by carefully superimposing a plurality of plates in an attempt to match theoretical transmission factors is a time consuming and thus expensive operation.

SUMMARY OF THE INVENTION

With the above discussion in mind, it is the object of the present invention to provide a photoelectric colorimeter whereby it is possible to automatically compensate for the differences between theoretical and actual transmission factors of the primary filters.

It is a further object of the present invention to provide such an improved colorimeter whereby such errors are automatically compensated for by the colorimeter during the operation thereof, without the necessity of attempting to modify the conventional primary filters.

These objects are achieved in accordance with the present invention by providing a colorimeter wherein a first quantity of light from a light source is passed through a first lens, a pinhole, a second lens, and a light incident port of a hollow light integration sphere toward a color sample positioned at a sample installation port of the sphere. The light is diffused and reflected from the color sample and is further diffused within the sphere and then passes through a light receiving port of the sphere toward a single photocell element which has connected thereto a primary or tristimulus value measuring device. A first carriage has supported thereon three conventional primary filters, and the carriage is reciprocably mounted to position a selected primary filter between the light receiving port and the photocell element. The light incident port and the sample installation port are coaxially aligned with a first diametral line of the sphere. The light receiving port is coaxially aligned with a second diametral line of the sphere, the second diametral line being perpendicular to the first diametral line. Located adjacent the light source is a second carriage which has mounted thereon novel primary filter mirrors. The second carriage is reciprocably mounted to position adjacent the light source a selected primary filter mirror corresponding to that primary filter which is positioned between the light receiving port and the photocell element. A second quantity of light is directed toward the selected primary filter mirror. This selected primary filter mirror reflects the light and changes its spectral characteristics and then passes the light through the first lens, the pinhole, the second lens, the light incident port, the color sample, the selected primary filter, and to the single photocell element. Thus, the single photocell element simultaneously receives two quantities of light, and the measuring device measures a resultant amount of the selected primary or tristimulus value in the light.

BRIEF DESCRIPTION OF THE DRAWINGS

Other objects, features and advantages of the present invention will be apparent from the following detailed description, with reference to the accompanying drawings, wherein:

FIG. 8 is a graph comparing ideal and prior art actual transmission factors of Z primary filters;

FIG. 9 is a graph comparing ideal and prior art actual transmission factors of X primary filters;

FIG. 10 is a graph comparing ideal and actual spectral characteristics of Z primary filter mirrors;

FIG. 11 is a graph comparing ideal and actual spectral characteristics of X primary filter mirrors;

FIG. 12 is a cross-sectional schematic view illustrating the construction of the filter mirrors of the present invention;

FIG. 13 is a front elevation view of a filter mirror in accordance with the present invention; and FIG. 14 is a schematic representation illustrating an X primary filter.

DETAILED DESCRIPTION OF THE INVENTION

Initially, to more clearly illustrate and emphasize the novel features of the present invention, the construction and operation of a typical prior art photoelectric colorimeter will be described.

Figure 1:
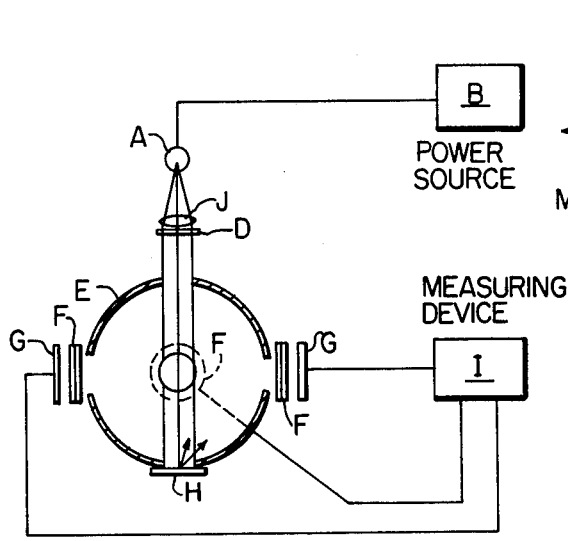
FIG. 1 is a schematic illustrating of a prior art photoelectric colorimeter.

As shown in FIG. 1, a typical prior art photoelectric colorimeter has an optic system including a light source A adapted to be energized by a constant voltage power source B, a lens J and a heat absorbing filter D. Lens J forwards the light from source A in parallel beams through filter D and through a light incident port of a light integration sphere E. The light beam is then directed through a sample installation port provided in the wall of sphere E against a color sample H. The light is diffused and reflected by sample H and passes through three light receiving ports in the sphere E. At each such light receiving port is located a light receiving element G, for example a photocell. In front of each element G is provided a primary color filter F to conform the spectral sensitivity of the respective elements G as close as possible to the three primaries or tristimulus values X, Y and Z. A conventional measuring apparatus I is connected to the three elements G and reads the amounts of the three primaries or tristimulus values detected thereby, thus giving an indication of the amounts of the primaries or tristimulus values in the light reflected by the sample H. It will be apparent that the accuracy of such readings will be dependent upon the accuracy of the primary filters F.

Figure 3:
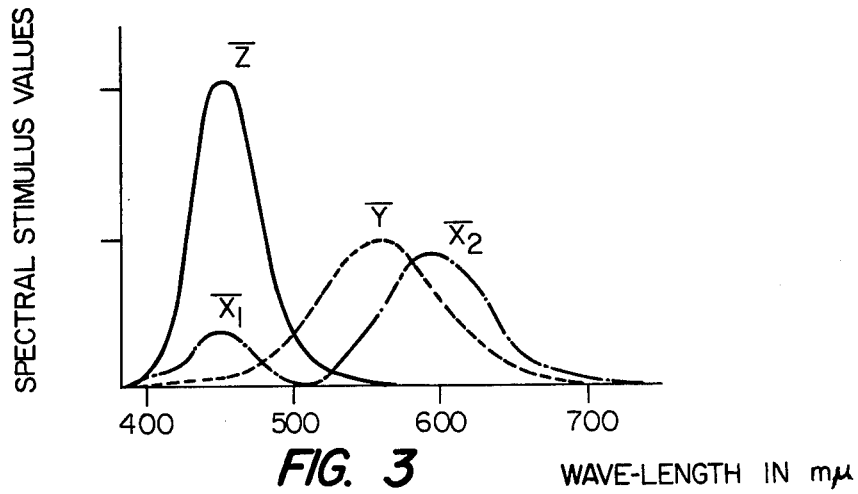
FIG. 3 is a graph illustrating spectral stimulus values in accordance with the Japanese Industrial Standard Colorimetry System.

The primary or tristimulus values of the spectral distribution of the light source are determined in accordance with a standard colorimetry system. Values mentioned herein will be with reference to the Japanese Industrial Standard Colorimetry System, as illustrated graphically in FIG. 3. As is conventional, the spectral stimulus or primary value $\bar{x}$ consists of two convexities $\bar{x}_1$ and $\bar{x}_2$, while stimulus or primary values $\bar{y}$ and $\bar{z}$ each have only one convexity. The measured primary or tristimulus values are generally represented by X, Y and Z in C illumination. Conventionally, halogen or tungsten lamps are employed for obtaining C light measurements.

Accordingly, the spectral characteristics of the stimulus or primary filters are provided by the following equations, taking into account the characteristics of the light source and the heat absorbing filter:

$$X = Ec\lambda \cdot \bar{x}\lambda \cdot \rho\lambda = E_A\lambda \cdot Fx\lambda \cdot s\lambda \cdot F'\lambda \cdot \rho\lambda;$$

$$Y = Ec\lambda \cdot \bar{y}\lambda \cdot \rho\lambda = E_A\lambda \cdot Fy\lambda \cdot s\lambda \cdot F'\lambda \cdot \lambda; \text{ and}$$

$$Z = Ec\lambda \cdot \bar{z}\lambda \cdot \rho\lambda = E_A\lambda \cdot Fz\lambda \cdot s\lambda \cdot F'\lambda \cdot \rho\lambda; \text{ wherein:}$$

X, Y, Z . . . the primaries or tristimulus values $EC\lambda$ . . . distribution of the C light source $\bar{x}\lambda, \bar{y}\lambda, \bar{z}\lambda$ . . . spectral stimulus values $\rho\lambda$ . . . light reflected or transmitted by a given sample $E_A\lambda$ . . . energy distribution of a tungsten lamp $F'\lambda$ . . . spectral transmission of the heat absorbing filter $Fx\lambda, Fy\lambda, Fz\lambda$ . . . the distribution of filters for the stimulus values Consequently, the following equations are established.

$$Fx\lambda = \frac{Ec\lambda \cdot \bar{x}\lambda}{E_A\lambda \cdot s\lambda \cdot F'\lambda}$$

$$Fy\lambda = \frac{Ec\lambda \cdot \bar{y}\lambda}{E_A\lambda \cdot s\lambda \cdot F'\lambda}$$

$$Fz\lambda = \frac{Ec\lambda \cdot \bar{z}\lambda}{E_A\lambda \cdot s\lambda \cdot F'\lambda}$$

Figure 4:
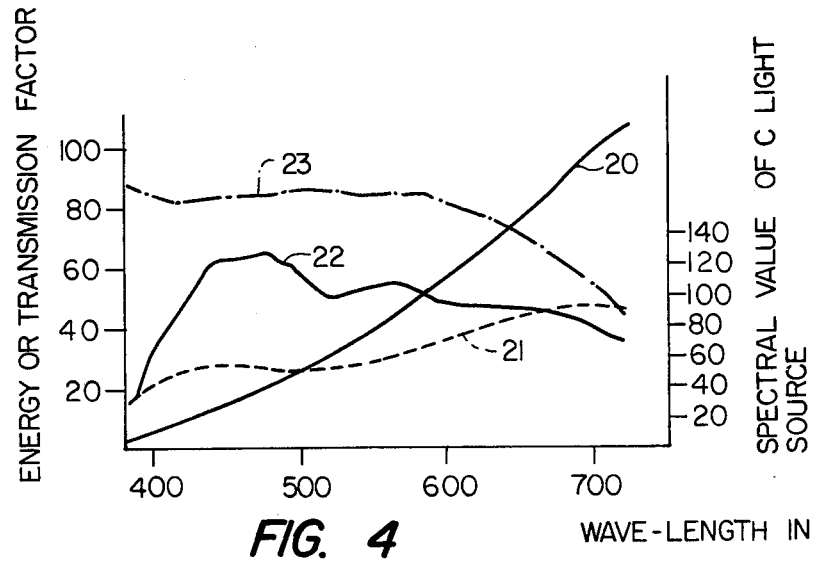
FIG. 4 is a graph illustrating a spectral ratio energy curve, a spectral sensitivity characteristic curve of a light receiving element, a spectral characteristic curve of a light source, and a spectral characteristic curve of a heat absorbing filter.

FIG. 4 graphically illustrates a spectral ratio energy curve 20 of the lamp, a spectral sensitivity characteristic curve 21 of a conventional light receiving element G, a spectral characteristic curve 22 of a C light source A, and a spectral characteristic curve 23 of a conventional heat absorbing filter D.

The X, Y and Z values can be obtained from these characteristics. Thus, the transmission factors $Fx\lambda$, $Fy\lambda$ and $Fz\lambda$ may be theoretically calculated and are represented by solid line curve 25 in FIG. 9, solid line curve 24 in FIG. 6, and solid line curve 26 in FIG. 8, respectively. Thus, these curves represent theoretical or ideal transmission factors for the three primary filters F.

Figure 5:
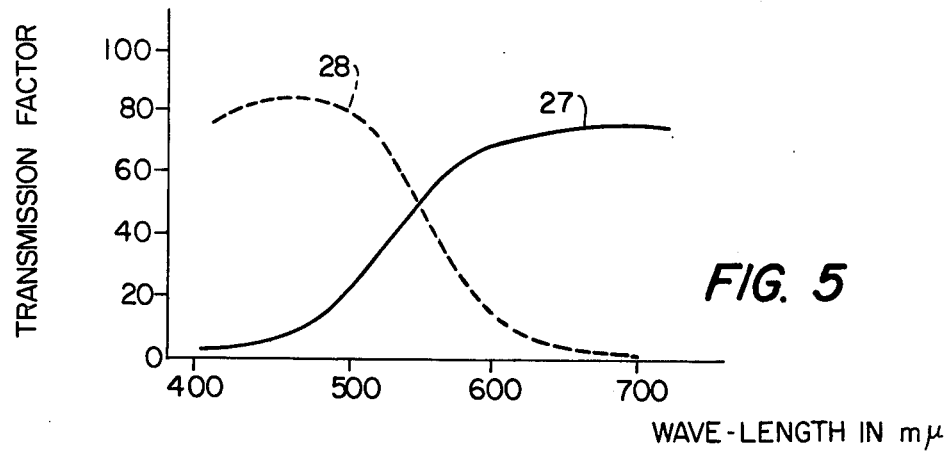
FIG. 5 is a graph showing light transmission factors of particular filters.
Figure 6:
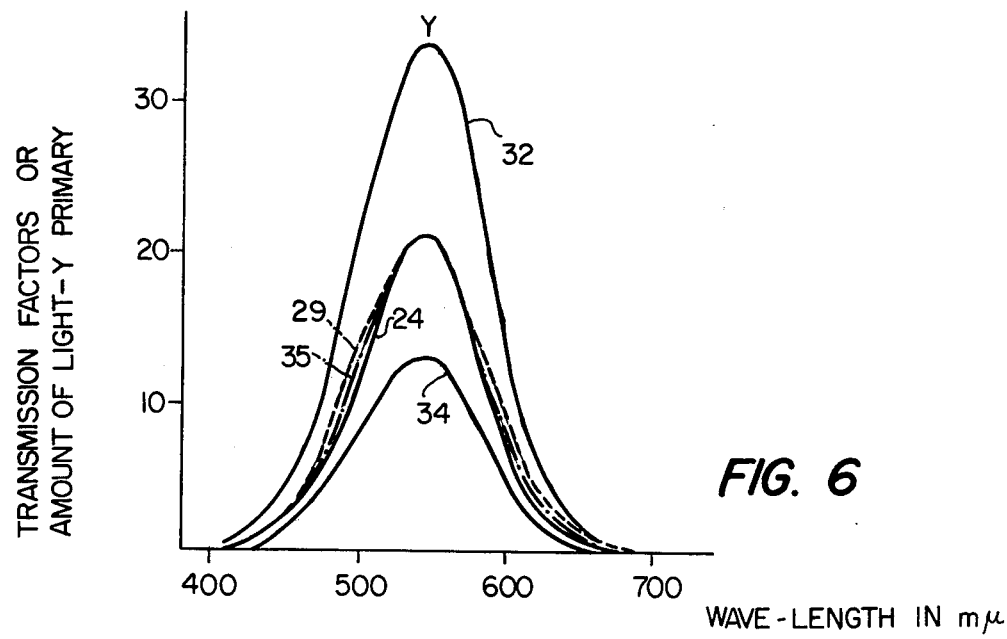
FIG. 6 is a graph illustrating transmission factors and amount of light characteristics of a Y primary filter mirror according to the invention and to a Y primary filter.

However, when actually manufacturing the primary filters, it is not possible to achieve filters having the ideal or theoretical transmission factors. For example, and with reference to FIG. 5, when attempting to manufacture a Y primary filter, an amber filter having the characteristic of curve 27 is combined with a blue filter having the characteristic of curve 28 to provide a combined Y primary filter having a characteristic as shown by dashed line curve 29 in FIG. 6. It will be apparent that when the convexities of curves 29 and 24 are superimposed as shown in FIG. 6, actual filter curve 29 will substantially differ from theoretical curve 24. Thus, the transmission factor $Fy\lambda$ of the actual Y primary filter will be substantially different from the transmission factor of the ideal or theoretical filter. This same error will also occur when attempting to manufacture the X and Z primary filters, as will be apparent from a comparison of ideal curve 25 and actual curve 30 in FIG. 9 and ideal curve 26 and actual curve 31 in FIG. 8, respectively.

When the above error is attempted to be corrected by modifying the characteristic curves 27 and 28 of the filters employed for manufacturing the Y primary filter, the convexities of transmission factor curves 24 and 29 then become different. Furthermore, attempts to add additional filters to compensate for the above error involve difficult and complex manufacturing operations, and it is generally not possible to provide a primary filter which performs in the theoretical manner. Furthermore, by employing a considerable number of separate filters to manufacture a primary filter, the amount of light received or passed through the primary filter is undesirably decreased.

In accordance with the present invention however, the above prior art disadvantages are overcome.

Figure 2:
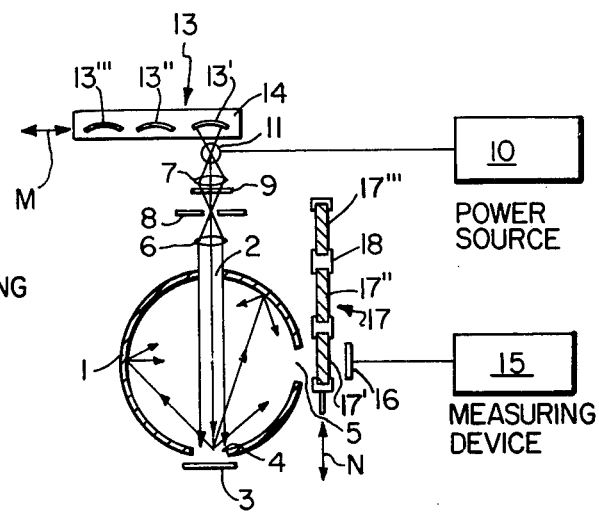
FIG. 2 is a schematic illustration of the improved colorimeter of the present invention.

The colorimeter of the present invention is illustrated in FIG. 2 and includes a light source 11 which is energized by a constant voltage power source 10, lenses 6 and 7, a heat absorbing filter 9, a pinhole 8, and a light integration sphere 1. Sphere 1 therein a light incident port 2 to receive parallel beams of light directed from lens 6. Sphere 1 also has therein a sample installation port 4 over which is installed a color sample 3. Ports 2 and 4 are located on a dimetral line of sphere 1. Sphere 1 also has therein a light receiving port 5 which is located on a second diametral line which is perpendicular to the diametral line containing ports 2 and 4. Located on the side of light source 11 opposite from sphere 1 is a carriage 14 which is reciprocally movable in directions indicated by arrow M. Carriage 14 has mounted thereon filter mirrors 13, i.e. filter mirror 13' for X, filter mirror 13" for Y, and filter mirror 13''' for Z. Positioned adjacent light receiving port 5 is a further carriage 18 mounted for reciprocal movement in directions indicated by arrow N. Carriage 18 supports thereon primary filters 17, i.e. primary filter 17' for X, primary filter 17" for Y, and primary filter 17''' for Z.

A single light receiving element 16, for example a conventional silicon photocell, is positioned behind filters 17, and a conventional measuring device 15 is attached to element 16.

Filter mirrors 13 have a construction as illustrated in FIGS. 12 and 13. That is, each filtering mirror 13 comprises a portion of a sphere and includes a filter section 12' and a reflecting mirror 12 exteriorly lining filter section 12'. Filter section 12' is preferably of a glass material having a transmission factor predetermined in a manner to be described in more detail below. Mirror 12 may be an evaporated film of aluminum, preferably coated with a protective coating agent, and capable of performing a spherical reflection. Alternatively, mirror 12 may be a metallic surface which is adhered to or welded to filter section 12'.

The movement of carriages 14 and 18 is synchronized, for example by any conventional and known mechanical expedient, such that the particular filter mirror 13 and the particular primary filter 17 for a given primary or tristimulus X, Y or Z are in operative position. In the position illustrated in FIG. 2, filter mirror 13' and primary filter 17' for primary or tristimulus X are in the operative position. Filter mirrors 13" and 13''' and primary filters 17" and 17''' for primary or tristimulus Y and for primary or tristimulus Z, respectively, may be moved into their operative positions by synchronized movement of carriages 14 and 18.

The power source 10, the light source 11, the heat absorbing filter 9, the primary filters 17, the light receiving photocell element 16, and the measuring device 15 may all be of conventional construction, for example those shown in the prior art arrangement of FIG. 1. Particularly, primary filters 17 may be the same as primary filters F shown in FIG. 1.

Attention is however further specifically directed to the fact that in accordance with the present invention sphere 1 has only a single light receiving port 5, and there is only a single light receiving element 16 employed.

Filter mirrors 13 perform both filtration and reflection functions and are employed in the manner described in more detail below to compensate for the measurement errors due to the differences occurring between ideal and actual transmission factors of actual primary filters.

The operation of the colorimeter of the present invention will now be described.

A portion of the light directly emitted from lamp 11 is passed directly through lens 7 and heat absorbing filter 9 and is focused thereby on pinhole 8. The image formed on pinhole 8 is then transferred into parallel beams by means of lens 6. These parallel beams then pass into sphere 1 through light incident port 2 and are applied through sample installation port 4 to color sample 5. The light is diffused and reflected from sample 3 and is further diffused within the sphere 1, and then passes through light receiving port 5 through the particular primary filter 17 positioned thereby to the light receiving photocell element 16.

On the other hand, and simultaneously with the above procedure, some light emitted from lamp 11 passes to the particular filter mirror 13 positioned thereby and is reflected by such filter mirror 13 such that the spectral characteristic of such light is changed. This light is then focused through lens 7 and heat absorbing filter 9 on pinhole 8, and is then transmitted to the light receiving element 16 via lens 6, sample 3, sphere 1 and the particular primary filter 17 which is operatively positioned in front of element 16.

Thus, there are simultaneously two different light beams being received by element 16, i.e. light directly received from lamp 11 and further light which is first reflected by filter mirror 13. Measuring device 15 reads a resultant light from a combination of these two lights.

The effect of this employment of direct light and reflected light will now be further described and graphically illustrated.

Assume that sample 3 is a white standard or reference plate comprising, for example, a plate smoked with oxidized magnesium having a reflection factor of approximately 100 for lights of wave lengths of from 380 to 760 m$\mu$. The first component of light from lamp 11, i.e. that component which is not reflected by filter mirror 13", has a characteristic as shown by curve 32 in FIG. 6, for the measurement of Y. This curve is similar to that obtained with the conventional colorimeter of FIG. 1, as discussed above. Curve 32 can of course be approximated to the theoretical or ideal curve 24 when the amount of light, i.e. the height of the curve, is reduced.

Figure 7:
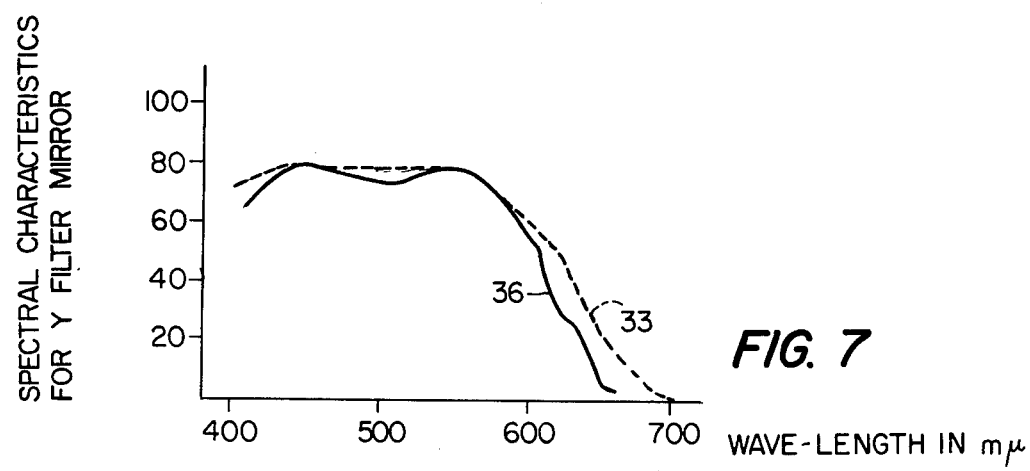
FIG. 7 is a graph comparing actual and ideal spectral characteristics of Y primary filter mirrors.

Additionally however, the second portion of light, i.e. that light from lamp 11 which is first reflected by filter mirror 13", exhibits the characteristic shown by curve 34 of FIG. 6 when the spectral characteristic of filter mirror 13" is as shown by curve 33 in FIG. 7.

It will be apparent that the resultant light received by light receiving photocell element 16 and measured by measuring device 15 is the sum of the lights of curves 32 and 34. As can be seen from FIG. 6, this resultant is curve 35 which is shown by a dashed and dotted line. It will further be apparent that curve 35 much more closely approximates the theoretical or ideal curve 24 then does curve 29 which is achieved by the prior art device of FIG. 1.

An ideal spectral characteristic 36 of compensating filter mirror 13" can be calculated in the following manner. Specifically, the mean value of the sum of the amount of light provided by curves 32 and 34 at each wave length, i.e. (32+34)/2, must be equal to the amount of light provided by the curve 24. Thus, the ideal amount of light of curve 34 may be readily obtained since the amount of light provided by curves 24 and 32 are known. That is, the ideal amount of light provided by curve 34 is the product of the transmission factor of curve 29 at each wave length and the reflected transmission factor of the filter mirror. Therefore, the ideal spectral characteristic 36 of the filter mirror 13″ can be obtained by dividing the ideal amount of light of curve 34 as obtained above by the value of curve 29. Similar calculations may be made for the ideal spectral characteristic of filter mirror 13′ for X, as shown by curve 38 in FIG. 11, and the ideal spectral characteristic of filter mirror 13‴ for Z, as shown by curve 37 in FIG. 10.

However, the primary 17′ for X, includes two sections as shown in FIG. 14, i.e. a smaller section $x_1$ and a larger section $x_2$. Since section $x_1$ is of a smaller rate than section $x_2$, compensation by filter mirror 13′ is provided only for section $x_2$, and no attempt is made by filter mirror 13′ to compensate for section $x_1$.

Given the ideal spectral characteristics of curves 36, 37 and 38, one of ordinary skill in the art would readily be able to make or obtain filter mirrors having very similar spectral characteristics. In fact, filter mirrors having spectral characteristics closely approximating those of curves 36, 37 and 38 are commercially available. Curves 33, 39 and 40 in FIGS. 7, 10 and 11, respectively, represent spectral characteristics of filter mirrors which have actually been used. Although curves 33, 39 and 40 slightly deviate from ideal curves 36, 37 and 38, respectively, such deviation is not significant, and it has in fact been determined that the actual filter mirrors employed do in fact satisfactorily compensate for the above discussed errors occurring in the prior art colorimeters. As particularly noted above, the use of filter mirror 13″ having the spectral characteristic of curve 33 resulted in a Y transmission factor corresponding to curve 35 in FIG. 6.

Additionally, due to the reflection performed by the mirror sections 12 of the filter mirrors 13, an amount of light which is approximately 1.5 times that obtained during use of the conventional apparatus of FIG. 1 is obtainable. This, through the resultant increase of SN ratio, greatly contributes to improve accuracy of the colorimeter measurements.

The following table shows the results of comparative tests involving measurements of standard color plates, made by colorimeter of the present invention and made by the prior art colorimeter such as shown in FIG. 1.

| Color | Reference Value | | | Meter of the Invention | | | Prior Art Meter | | |
|---|---|---|---|---|---|---|---|---|---|
| | x | y | z | x | y | z | x | y | z |
| Blue | 23.9 | 27.7 | 59.2 | 23.6 | 27.9 | 58.2 | 23.2 | 28.5 | 59.0 |
| Yellow | 51.3 | 58.1 | 7.3 | 51.8 | 57.9 | 6.8 | 53.9 | 58.7 | 6.1 |
| Green | 6.4 | 11.7 | 6.1 | 6.6 | 12.0 | 5.9 | 6.7 | 12.1 | 5.7 |
| Red | 19.4 | 9.8 | 1.5 | 19.4 | 9.9 | 1.4 | 19.0 | 10.9 | 1.1 |

It will be apparent that the colorimeter of the present invention was more accurate than was the colorimeter of the prior art arrangement. In fact, the maximum error from the standard reference values when employing the prior art colorimeter was 2.6, whereas the maximum error when employing the colorimeter of the present invention was 0.5

It will be further apparent that various modifications may be made to the above specifically described structural arrangements without departing from the scope of the present invention.

What is claimed is:

1. A colorimeter comprising:
   means for supporting a color sample;
   a light source;
   means for receiving and measuring amounts of primaries or tristimulus values in quantities of light;
   means for directing a first quantity of light directly from said light source to a color sample supported by said supporting means and from said color sample toward said receiving and measuring means;
   a plurality of primary filters;
   means for positioning a selected of said primary filters in front of said receiving and measuring means such that said first quantity of light passes through said selected primary filter before being received by said receiving and measuring means; and
   a plurality of primary filter mirror means, selectively positionable to receive a second quantity of light from said light source, for reflecting and changing the spectral characteristics of said second quantity of light and for then directing said second quantity of light to said color sample and then through said selected primary filter to said receiving and measuring means, whereby said receiving and measuring means simultaneously receives two quantities of light and measures a resultant amount of said selected primary or tristimulus value therefrom.

2. A colorimeter as claimed in claim 1, wherein said directing means comprises a hollow light integration sphere having therein a light incident port, a sample installation port, and a single light receiving port, whereby said first and second quantities of light enter said sphere through said light incident port, are directed against said color sample mounted on said sample installation port, and exit said sphere through said single light receiving port.

3. A colorimeter as claimed in claim 2, wherein said light incident port and said sample installation port are both coaxially aligned with a first diametral line of said sphere.

4. A colorimeter as claimed in claim 3, wherein said light receiving port is coaxially aligned with a second diametral line of said sphere, said second diametral line being perpendicular to said first diametral line.

5. A colorimeter as claimed in claim 2, wherein said directing means further comprises a pinhole positioned between said light source and said light incident port, a first lens positioned between said light source and said pinhole, a heat absorbing filter positioned between said first lens and said pinhole, and a second lens positioned between said pinhole and said light incident port.

6. A colorimeter as claimed in claim 1, wherein said receiving and measuring means comprises a single light receiving photocell element having connected thereto a measuring device for measuring primary or tristimulus quantities received by said photocell element.

7. A colorimeter as claimed in claim 1, wherein said primary filters comprise an X primary filter, a Y primary filter, and a Z primary filter, and said positioning means comprises a first carriage having said X, Y and Z primary filters mounted thereon, said first carriage being reciprocably mounted to position a selected one of said X, Y and Z primary filters in front of said receiving and measuring means.

8. A colorimeter as claimed in claim 7, wherein said primary filter mirror means comprises an X primary filter mirror, a y primary filter mirror, and a Z primary filter mirror.

9. A colorimeter as claimed in claim 8, further comprising a second carriage having mounted thereon said X, Y and Z primary filter mirrors, said second carriage being reciprocably mounted to position a selected said primary filter mirror adjacent said light source when a corresponding said primary filter is positioned in front of said receiving and measuring means.

10. A colorimeter as claimed in claim 8, wherein each of said primary filter mirrors comprises a filtering section in the configuration of a portion of a sphere, and a mirror section exteriorly attached to said filtering section.

11. A colorimeter as claimed in claim 1, wherein said primary filter mirror means comprises an X primary filter mirror, a Y primary filter mirror, and a Z primary filter mirror.

12. A colorimeter as claimed in claim 11, further comprising a carriage having mounted thereon said X, Y and Z primary filter mirrors, said carriage being reciprocably mounted to position a selected primary filter mirror adjacent said light source.

13. A colorimeter as claimed in claim 11, wherein each of said primary filter mirrors comprises a filtering section in the configuration of a portion of a sphere, and a mirror section exteriorly attached to said filtering section.

* * * * *